United States Patent
Marilly et al.

(10) Patent No.: US 7,286,965 B2
(45) Date of Patent: Oct. 23, 2007

(54) MODULAR EVOLVING KNOWLEDGE-BASED DIAGNOSTIC DEVICE FOR USE IN COMMUNICATION NETWORKS

(75) Inventors: Emmanuel Marilly, Saint-Michel-sur-Orge (FR); Stéphane Betge-Brezetz, Paris (FR); Olivier Martinot, Draveil (FR); Gérard Delegue, Cachan (FR); Mohamed Adel Saidi, Antony (FR); Sylvain Squedin, Nozay (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/203,975

(22) Filed: Aug. 16, 2005

(65) Prior Publication Data
US 2006/0064282 A1 Mar. 23, 2006

(30) Foreign Application Priority Data
Sep. 3, 2004 (FR) .................................. 04 51965

(51) Int. Cl.
G06F 11/30 (2006.01)
G21C 17/00 (2006.01)
(52) U.S. Cl. ...................................................... 702/183
(58) Field of Classification Search ................ 702/182, 702/183, 185, 188, 189
See application file for complete search history.

(56) References Cited

U.S. PATENT DOCUMENTS

| | | | | |
|---|---|---|---|---|
| 5,428,619 A | | 6/1995 | Schwartz et al. | |
| 5,448,722 A | * | 9/1995 | Lynne et al. | 706/49 |
| 5,806,056 A | * | 9/1998 | Hekmatpour | 706/50 |
| 6,415,150 B1 | * | 7/2002 | Owens et al. | 455/445 |
| 2006/0156086 A1 | * | 7/2006 | Flynn et al. | 714/712 |

OTHER PUBLICATIONS

Lazar A A et al: "An architecture for managing quality of service on broadband networks," Singapore ICCS/ISITA 1992. 'Communications on the Move' Singapore Nov. 16-20, 1992, New York, NY, USA, IEEE, US, Nov. 16, 1992, pp. 974-978, XP010067214.

Corn P A et al.: "An autonomous distributed expert system for switched network maintenance" Globecom 88; IEEE Global Telecommunications Conference and Exhibition: Communications for the Information Age, Nov. 28, 1988, pp. 1530-1537, XP010071823.

* cited by examiner

*Primary Examiner*—Michael Nghiem
(74) *Attorney, Agent, or Firm*—Sughrue Mion Pllc.

(57) ABSTRACT

A diagnostic device, for use in a communication network including network equipments is provided. The diagnostic device includes a diagnostic module that is adapted to determine the pause of problems occurring within the network on the basis of information provided by the network equipments. The diagnostic module includes a knowledge base in the form of basic diagnostic units and a processing module adapted to establish hierarchical associations between basic diagnostic units selected in the knowledge base to constitute configurable diagnostic models adapted to determine the cause of problems.

11 Claims, 1 Drawing Sheet

MODULAR EVOLVING KNOWLEDGE-BASED DIAGNOSTIC DEVICE FOR USE IN COMMUNICATION NETWORKS

CROSS-REFERENCE TO RELATED APPLICATIONS

This application is based on French Patent Application No. 0451965 filed Mar. 9, 2004, the disclosure of which is hereby incorporated by reference thereto in its entirety, and the priority of which is hereby claimed under 35 U.S.C. §119.

BACKGROUND OF THE INVENTION

1. Field of the Invention

The invention relates to managed communication networks and more particularly to diagnostic devices for determining the causes of problems occurring in such networks.

2. Description of the Prior Art

The person skilled in the art knows that problems occurring in communication networks can have various causes, for example a power outage, a broken connection, a breakdown or malfunction of a network equipment or a component thereof, software, integrating a version of a network equipment or a component thereof, or software that is not fully compatible with the remainder of the network.

Many diagnostic devices (also known as diagnostic tools) for determining the causes of problems have been proposed in the past. Some use techniques based on object-oriented and/or rules-based programming languages, possibly managed by a rules engine. Of such devices, there may be mentioned, for example, Expert (Event Correlation expert) for constructing alarm correlation trees from rules defined manually, devices from ILOG that use a programmable rules engine for diagnosis, devices from Hewlett Packard, in particular the Network Node Manager®, version 6.4, and the Network Node Manager Extended Topology®, version 2.0, which use a technique based on fault models, the Fault Detective for Data Communications (FDDC) from Agilent, which replaces the fault diagnosis operations effected by technicians with automated diagnostic methods, and the TACO device from CISCO, which is a problem detection assistant.

The main drawback of the above devices is their mode of acquiring information (also referred to as expert knowledge). If the diagnostic device is developed for a company that is not a systems integrator, the knowledge base or expert knowledge base is not well adapted to certain specific equipments or to certain combinations of equipments.

If the diagnostic device is developed by a systems integrator, the knowledge base or expert knowledge base contains only basic information, with the result that certain features specific to the equipment are not taken into account, for example the type, method of fabrication, date of fabrication, version and mode of use. Critical information and the diagnostic devices themselves are generally not communicated to the user client.

Defining new and specific diagnostic or verification technique therefore proves to be very difficult, and sometimes it is even the case that the tool cannot be modified at all. In other words, the above diagnostic devices suffer from a lack of flexibility.

ALCATEL also offers a diagnostic device based on Bayesian probabilistic theory and used to define rules for refining hypotheses on the basis of concepts of additional evidence and background information, which lead to numbers each representing the probability that a hypothesis is true and used to construct Bayesian networks (also known as Bayesian diagrams) defining test operations associated with statistical or probabilistic weights.

The main drawback of the above device is that its Bayesian networks, and the tests associated with them, cannot be modified once they have been integrated. Consequently, if a user client realizes that a Bayesian network is not totally adapted to his network, or that a specific equipment necessitates a particular test, the diagnostic device cannot be adapted. This kind of diagnostic device therefore also suffers from a lack of flexibility.

No prior art diagnostic device proving entirely satisfactory, an object of the invention is therefore to improve on this situation.

SUMMARY OF THE INVENTION

The invention therefore proposes a diagnostic device comprising diagnostic means comprising a knowledge base taking the form of basic diagnostic units, and processing means for establishing selected hierarchical associations between selected units from the knowledge base in order to constitute configurable diagnostic models adapted for determination by the diagnostic means of the causes of problems occurring within the network from information supplied by its network equipments.

The diagnostic device may have the following additional features in particular, separately or in combination:

the processing means may be adapted to associate basic diagnostic units by means of selected rules; in this case, the processing means may comprise a rules engine for establishing the selected hierarchical associations between the selected units, for example; also, at least some of the rules may be of the statistical type;

its processing means may be adapted to associate at least some of said basic diagnostic units by means of selected models;

its processing means may be adapted to associate certain selected basic diagnostic units in selected trees constituting certain of said diagnostic models;

its processing means may be adapted to associate selected statistical or probabilistic weights with at least certain of said basic diagnostic units and/or at least certain of said rules and/or at least certain of said models;

its processing means may be adapted to associate selected administrative costs with at least certain of said basic diagnostic units and/or at least certain of said rules and/or at least certain of said models;

at least certain of said diagnostic models may take the form of a Bayesian network (or diagram);

at least certain of said basic diagnostic units may take the form of a Bayesian network (or diagram);

at least certain of said basic diagnostic units may take the form of sets of hierarchical tests;

its processing means may be adapted to modify at least certain of said basic diagnostic units and/or at least certain of said rules and/or at least certain of said models and/or at least certain of said statistical or probabilistic weights and/or at least certain of said administrative costs;

its processing means may comprise a man/machine interface adapted to enable a user to effect said associations and/or said modifications.

DETAILED DESCRIPTION OF THE PREFERRED EMBODIMENT

The appended drawings constitute part of the description of the invention as well as, if necessary, contributing to the definition of the invention.

An object of the invention is to use one or more diagnostic models to determine the cause of a problem that has occurred within a managed communication network.

The invention relates to any type of managed network (and in particular Internet protocol (IP) networks) and any type of service within a managed network. The diagnosis may relate to the network level (network equipments and configuration) or the management and service level (network equipments, configuration, quality of service (QoS), and service level agreement (SLA)).

Figure 1:
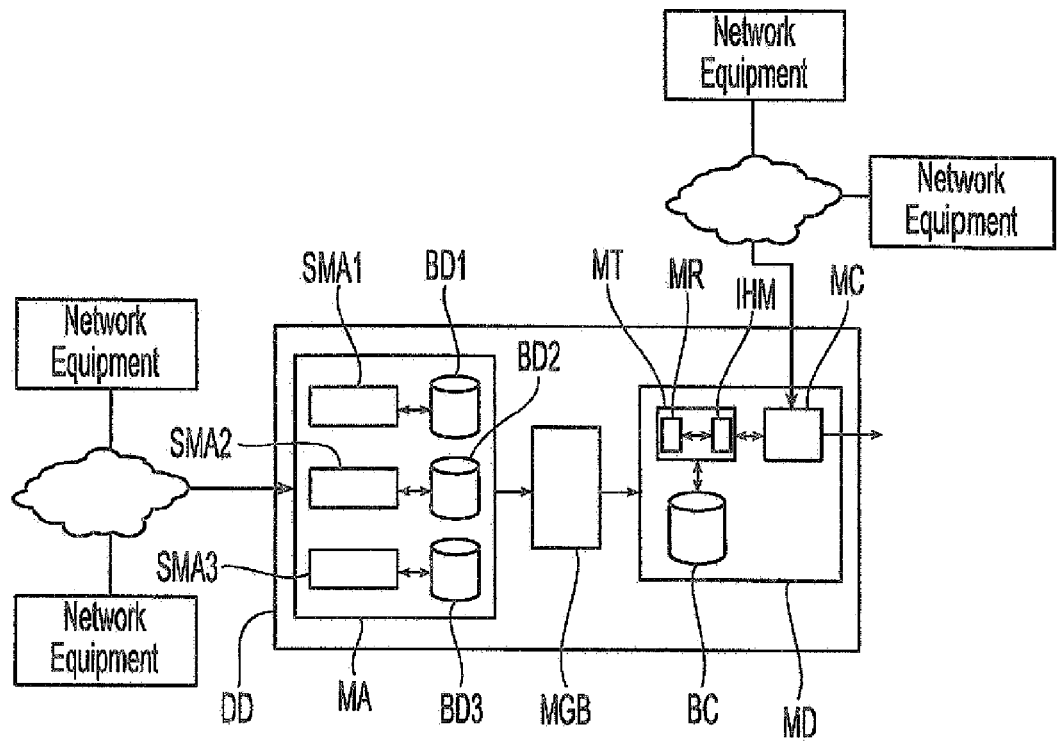
FIG. 1 is a diagram of one embodiment of a diagnostic device of the invention.

The invention proposes a diagnostic device DD comprising, as shown in FIG. 1, a diagnostic model MD for determining causes of problems from information supplied by the equipments of the network. A device DD of this kind is installed in the network management system (NMS), for example, or in the service management system of the network when it is a service that is to be diagnosed.

For example, the information coming from the network equipments consists of alarms, which the network equipments send automatically to the NMS if they detect a problem (failure or malfunction) within themselves (i.e. affecting one of their components, for example an input or output interface) or with one of their connections. However, it may equally consist of management and/or operating information obtained from certain network equipments at the request of the NMS and generally stored in their management information base (MIB). It may equally consist of measured values of network parameters, for example the bandwidth used on certain connections or certain calls (traffic analysis) or the rate of loss of packets on certain connections or certain calls, which in particular enable network operators to monitor and manage the quality of service (QoS) associated with each user client (or each service) and defined by a service level agreement (SLA).

Generally speaking, any information useful for the diagnosis may be fed to the diagnostic module MD of the diagnostic device DD.

According to the invention, the diagnostic module MD includes an expert knowledge base BC taking the form of basic diagnostic units and a processing module MT for establishing selected hierarchical associations between selected units from the knowledge base BC in order to construct configurable diagnostic models adapted to determine the causes of problems.

The knowledge base BC is preferably constructed from data (or information) from different sources, for example equipment design data (specification, configuration, validation etc., and problems and/or weaknesses already encountered), equipment fabrication data (components used, technologies used, etc., and problems and/or weaknesses already encountered), data from equipment tests carried out in the laboratory (critical failures, reliability, bugs, compatibility, service life, etc.), and information on use under real life conditions (such information coming in particular from user clients, maintenance services and failure reports and consisting, for example, of statistical information relating to reliability and to the timescale of equipment and component failures, the most frequent failures of equipments as a function of a specific use or a specific fabrication process, equipment compatibilities, service life, etc.).

As shown in FIG. 1, the diagnostic device DD includes an analysis module MA for collecting data and information from the network itself or from the network operator and analyzing that data and information with a view to selecting data and information useful for a selected diagnosis.

For example, the analysis module MA is divided into three analysis submodules SMA1 to SMA3 coupled to respective databases BD1 to BD3.

For example, the analysis submodule SMA1 is dedicated to analyzing equipment design and fabrication data and information, the analysis submodule SMA2 is dedicated to analyzing equipment laboratory test data and information, and the analysis submodule SMA3 is dedicated to analyzing data and information on use under real life conditions.

The expert knowledge data retained during the analysis effected by a submodule SMAi (in the present example i=1 to 3) is stored in the associated database BDi. The data and information on use under real life conditions generally vary in time, and it is advantageous to update them regularly, for example periodically, in the database BD3.

Data may be analyzed in the various analysis submodules SMAi by any means, and in particular by means of statistical methods such as data mining, for example, or a learning technique, a signal processing technique, a prediction/trend technique or a technique based on experience. It is preferably carried out under the control of an expert.

When the diagnostic device DD includes an analysis module MA, it also includes, as shown in FIG. 1, a knowledge base generation module MGB which is coupled to the analysis module MA (to be more precise to its databases BDi) and to the diagnostic module MD.

The knowledge base generation module MGB may generate the knowledge base or bases BD necessary for the diagnostic module MD by the method indicated hereinafter, for example.

For example, the knowledge base generation module MGB begins by constructing a knowledge core in the form of basic diagnostic units from equipment design and fabrication data and information stored in the database BD1. It then uses the laboratory equipment test data and information stored in the database BD2 to enhance the knowledge base. Finally, it adds to the enhanced knowledge core data and information concerning use under real life conditions stored in the database BD3, to construct a knowledge base BC in the form of basic diagnostic units adapted to the network to be diagnosed.

Any technique known to the person skilled in the art may be used by the knowledge base generation module MGB to generate a knowledge base BC in the form of basic diagnostic units. Of such techniques, there may in particular be cited statistical techniques, techniques based on rules and/or models, and learning techniques, for example of the neural network or Petri network type.

Generation of each knowledge base BC by means of the knowledge base generation module MGB is preferably carried out under the control of an expert.

Once generated by the knowledge base generation module MGB, the knowledge base BC is communicated to the diagnostic module MD.

Because it is generally the case that some of the data stored in the databases BDi varies in time (in particular the data stored in the database BD3), it is advantageous to update the knowledge base BC that is communicated to the diagnostic module MD regularly, for example periodically. The knowledge base generation module MGB may be adapted accordingly.

It is important to note that the diagnostic device DD need not include the analysis module MA and the knowledge base generation module MGB if the knowledge base BC is supplied to it from elsewhere.

The diagnostic module MD includes a processing module MT for establishing selected hierarchical associations between selected blocks of the knowledge base BC to construct configurable diagnostic models adapted to determine the causes of problems occurring within the network concerned.

In the present context, the expression "hierarchical association" means any causal association or combination of blocks, i.e. an association or combination in which the blocks must be used relative to each other in a particular order, which may be predetermined.

Any method may be used by the processing module MT to associate hierarchically basic diagnostic units. It may in particular use selected rules and/or selected models and/or statistical methods.

One particularly simple example of a hierarchical association of three blocks that can be effected by the processing module MT and is not limiting on the invention is described below:

execute block 1 of the knowledge base BC,
if block 1 does not detect a fault then execute block 2,
if block 2 does not defect a fault then execute block 3.
It is important to note that at least some of the rules may be of the statistical type.

Figure 2:
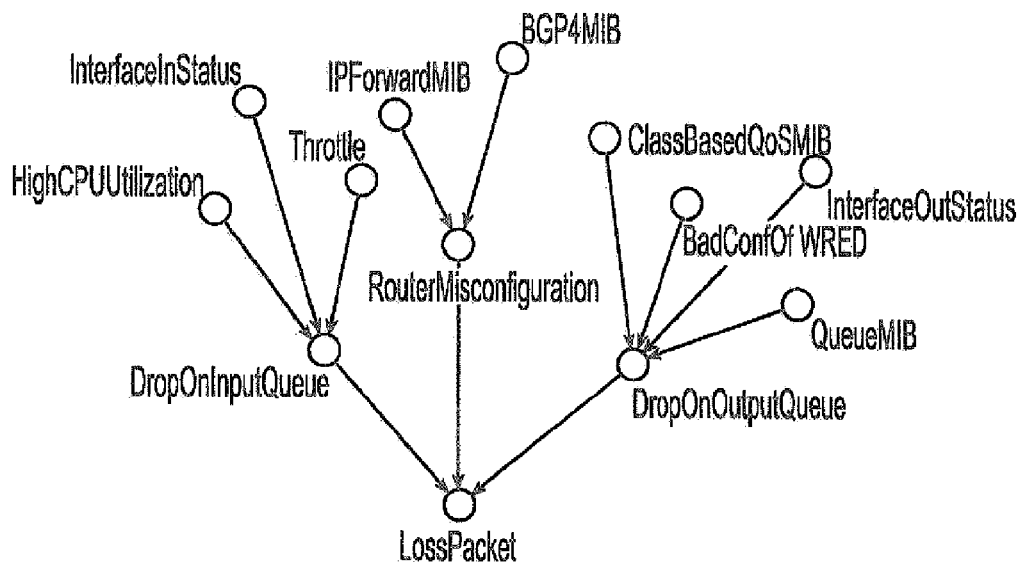
FIG. 2 is a diagram of one example of a Bayesian network adapted to determine the cause of a loss of packets in an Internet protocol virtual private network.

FIG. 2 shows a more complex example of a hierarchical association, this time comprising thirteen blocks, which can be effected by the processing module MT and is not limiting on the invention. In this example, the processing module MT has established a diagnostic model adapted to determine the cause of packet loss in an Internet Protocol virtual private network (IP VPN).

In this example the diagnostic model takes the form of a Bayesian network (or causal diagram) familiar to the person skilled in the art. Each node of the Bayesian network is designated by a name that represents the output variable of a set of basic tests to be executed comprising at least one such test.

It should be remembered that a Bayesian network is intended, when it is executed, to detect any problem that may exist and its cause or causes.

A Bayesian network is a causality tree. In the FIG. 2 example, three causes of packet loss are shown, each of which is assigned a certain probability: DropOnInputQueue (with probability X), RouterMisconfiguration (with probability Y), and DropOnOutputQueue (with probability Z), the sum of these three probabilities X, Y and Z being equal to 1.

Similarly, within each branch leading away from PacketLoss, each sub-branch is assigned a probability. For example, one of the causes of the branch DropOnInputQueue is Throttle, which is assigned probability X1.

The Bayesian nodes of the FIG. 2 example are defined below.

LossPacket designates a scenario for finding the root cause of packet loss in an IP VPN. It executes various tests according to the cause probabilities. For example, the LossPacket scenario first tests interfaceInStatus (which is generally the most probable cause). Then, if interfaceInStatus is OK, it tests interfaceOutStatus (which is generally the second most probable cause). If interfaceOutStatus is NOK (not OK), LossPacket sends InterfaceOutStatus NOK, the cause of the problem (for example: an interface is not working) and the number of packets lost, if that can be determined.

DropOnInputqueue is a variable indicating if packets have been dropped at an ingress interface.

RouterMisconfiguration is a variable that cannot be observed directly. It indicates if a router is configured correctly.

DropOnOutputQueue is a variable indicating if packets have been dropped at an egress interface.

As previously indicated, within the Bayesian network dedicated to packet loss, DropOnInputQueue is assigned a probability X that represents the probability that the cause of the packet loss is linked to the input queue (InputQueue), while RouterMisconfiguration is assigned a probability Y that represents the probability that the cause of the packet loss is linked to misconfiguration of a router, and DropOnOutputQueue is assigned a probability Z that represents the probability that the cause of packet loss is linked to the output queue (OutputQueue).

Similarly, within the branch associated with DropOnInputQueue, there is a probability X1 that the cause of packet loss is linked to HighCPUUtilization, a probability X2 that the cause of the packet loss is linked to Throttle, and a probability X3 that the cause of the packet loss is linked to InterfaceInStatus.

Consequently, if it is wished to determine whether the cause of packet loss is linked to the input queue (InputQueue), it is necessary to determine whether HighCPUUtilization is OK or NOK (not OK) and/or if Throttle is OK or NOK and/or if InterfaceInStatus is OK or NOK.

InterfaceInStatus is a variable modeling the status of the input interfaces.

Throttle is a variable indicating whether a port is out of service or not and provides an indication as to the state of (over)loading of a router. It indicates the number of times that the receiver at a given port has been out of service, for example because of a processing overload or a buffer overload.

HighCPUUtilization is a variable indicating whether the processing (or CPU) capacity of a router is overloaded or not.

BGP4MIB is a variable representing the configuration status of a border gateway protocol (BGP). For example, if BGP4MIB is OK, the BGP is configured correctly, whereas if BGP4MIB is NOK, the BGP is not configured correctly.

IPForwardMIB is a test variable for determining whether an LSP has been set up or not.

ClassBasedQoSMIB is a test variable for determining if the quality of service (QoS) policy is appropriately configured and implemented in the router.

InterfaceOutStatus is a variable modeling the status of the output interfaces.

BadConfOfWRED is a test that verifies the configuration of the weighted random early detection (WRED) algorithm that verifies for each output interface associated with an output label (label out) if a random early detection (RED) type queuing strategy has been defined, after which it collects the total number of packets extracted.

QueueMIB is a variable for verifying if the policy models (policy-map) are defined in an input interface and an output interface.

In this example of a Bayesian network, the respective positions of the nodes are representative of the probabilities that are associated with the respective branches to which they belong.

Additional information on Bayesian networks and their use in diagnostic devices can be found in the document by F. Jensen, "An introduction to Bayesian Networks", UCL Press, 1996 (out of print, reissued in 2001).

It is important to note that at least some of the basic diagnostic units that are used in a diagnostic model (whether of the Bayesian network type or not) can also take the form of a Bayesian network (or diagram).

It is equally important to note that a diagnosis can be arrived at through means other than tests, and in particular active or passive measurements, alarm correlation, configuration verification, and verification of the consistency of the configuration of a service across the network and of the reading of parameters specific to an equipment stored in management information bases (MIBs) or available in certain network equipments such as routers.

A detailed example of obtaining information for generating diagnostic tests relating to quality of service (QoS) within an IP VPN is described in the document by Gérard Delègue et al., "IP VPN Network Diagnosis: Technologies and Perspectives", 3rd International Conference on Networking, March 2002.

The processing module MT may comprise a rules engine MR for establishing selected hierarchical associations between selected basic units, preferably under the control of an expert.

In the case of Bayesian network type diagnostic models constructed by associating basic test units by means of rules and in the case of diagnostic models constructed by associating basic test units by means of models, the processing module MT can be adapted to associate selected statistical or probabilistic weights and/or selected administrative costs with at least some of the basic diagnostic units and/or at least some of the rules and/or at least some of the models.

Associating statistical or probabilistic weights means that certain sets of tests can be made more (or less) important than other sets of tests in the context of a diagnosis. Associating administrative costs means that certain sets of tests can be used only if the cost of a diagnosis is important.

Associating selected statistical or probabilistic weights and/or selected administrative costs is preferably effected under the control of an expert.

In this variant, it is advantageous to use a man/machine interface IHM of the type described above to display on a screen a blank tree selected by an expert and to have that expert fill in the nodes of that tree (or a portion thereof) with basic diagnostic units.

The processing module MT can be adapted to establish the associations automatically, on the basis of instructions supplied by an expert. However, it can equally be adapted to propose or to make available some or all of the basic units of a knowledge base BC and/or some or all of the rules linking said basic units that might be envisaged, in order for an expert to define the associations intended to constitute a diagnostic model. In this case, the diagnostic module MT is also responsible for the (physical) generation of the diagnostic models defined by the user.

To enable an expert to control (or define) each association, whether it is an association of blocks in the context of generating a diagnostic model or an association of statistical or probabilistic weights and/or administrative costs, the processing module MT comprises a man/machine interface IHM, for example a graphical user interface (GUI).

In the absence of an interface IHM, the expert can send his instructions to the processing module MT by means of any type of command, for example of the command line (CLI) type, or code.

This kind of interface IHM may also be used by an expert to modify at least some of the basic diagnostic units and/or at least some of the rules (and where applicable their statistical or probabilistic weights) and/or at least some of the models and/or at least some of the statistical or probabilistic weights and/or at least some of the administrative costs.

In the present context, the term "modify" means any intervention whose purpose is to add, delete or change something. Consequently, a modification may consist in adding or deleting or changing one or more basic units (or a portion thereof) and/or one or more rules and/or models in a knowledge base BC or in a diagnostic model.

An embodiment is described above in which the processing module MT effects hierarchical associations by means of rules and/or models. However, a variant may be envisaged in which the processing module MT effects hierarchical associations of basic diagnostic units selected within selected trees. In this case, each completed tree finally constitutes a diagnostic model.

In this variant, it is advantageous to use a man/machine interface IHM of the type described above to display on a screen a blank tree selected by an expert and to have the expert fill in nodes of that tree (or a portion thereof) with basic diagnostic units.

In this case, association simply consists in stringing basic units to be executed in the order defined by the tree concerned, without rules or models linking associated basic units.

Once a diagnostic model has been generated by the processing module MT and activated, it can then be used by a calculation module MC of the diagnostic module MD. The calculation module MC feeds the activated diagnostic model with information that comes (directly or indirectly) from network equipments, for example alarms, and delivers to an output a diagnosis, i.e. the cause or causes of a problem that has occurred within the network.

The calculation module MC is adapted as a function of the diagnostic model or models that it uses. It is therefore designed to run the scenario of a diagnostic model and uses, for example, a database, SNMP tools etc., and delivers at an output results constituting diagnostics.

For example, the calculation module MC may be coupled to an auxiliary module for proposing to the network operator actions for remedying each cause determined in a diagnosis.

It is important to note that the diagnostic device DD can include one or more auxiliary diagnostic modules or one or more auxiliary diagnostic models in addition to that (MD) described above and of different designs. In this case, the calculation module MC of the diagnostic module MD can be adapted to use each activated diagnostic model, regardless of its design.

It is also important to note that a diagnosis effected by a diagnostic device DD can relate to network equipments of any type, whether pure hardware (components), pure software or combinations thereof.

The diagnostic device DD of the invention, and in particular its analysis module MA, its knowledge base generation module MGB and its diagnostic module MD, may be implemented in the form of electronic circuits, software (data processing) modules or a combination of circuits and software.

The invention is not limited to the embodiments of a diagnostic device described above by way of example only, and encompasses all variants that the person skilled in the art might envisage that fall within the scope of the following claims.

There is claimed:

1. A diagnostic device for use in a communication network comprising network equipments, said device comprising:
   diagnostic means that are adapted to determine the cause of problems occurring within said network on the basis of information provided by said network equipments, the diaanostic means comprising;
   a knowledge base in the form of basic diagnostic units, and
   processing means comprising a rules engine adapted to establish hierarchical associations between basic diagnostic units selected in said knowledge base by means of selected rules to constitute configurable diagnostic models adapted to determine said causes of said problems.

2. The device claimed in claim 1 wherein at least some of said rules are of a statistical or probabilistic type.

3. The device claimed in claim 2 wherein said processing means are adapted to associate selected statistical or probabilistic weights with at least certain of said basic diagnostic units and/or at least certain of said rules and/or at least certain of said models.

4. The device claimed in claim 1 wherein said processing means are adapted to associate at least some of said basic diagnostic units by means of selected models.

5. The device claimed in claim 1 wherein said processing means are adapted to associate certain selected basic diagnostic units in selected trees constituting certain of said diagnostic models.

6. The device claimed in claim 1 wherein said processing means are adapted to associate selected administrative costs with at least certain of said basic diagnostic units and/or at least certain of said rules and/or at least certain of said models.

7. The device claimed in claim 1 wherein at least certain of said diagnostic models take the form of a Bayesian network.

8. The device claimed in claim 1 wherein at least certain of said basic diagnostic units take the form of a Bayesian network.

9. The device claimed in claim 1 wherein at least certain of said basic diagnostic units take the form of sets of hierarchical tests.

10. The device claimed in claim 1 wherein said processing means are adapted to modify at least certain of said basic diagnostic units and/or at least certain of said rules and/or at least certain of said models and/or .at least certain of said statistical or probabilistic weights and/or at least certain of said administrative costs.

11. The device claimed in claim 1 wherein said processing means comprise a man/machine interface adapted to enable a user to effect said associations and/or said modifications.

* * * * *